July 2, 1963  D. W. DAVIS  3,096,032
LIGHTING DIFFUSER
Filed Sept. 23, 1959
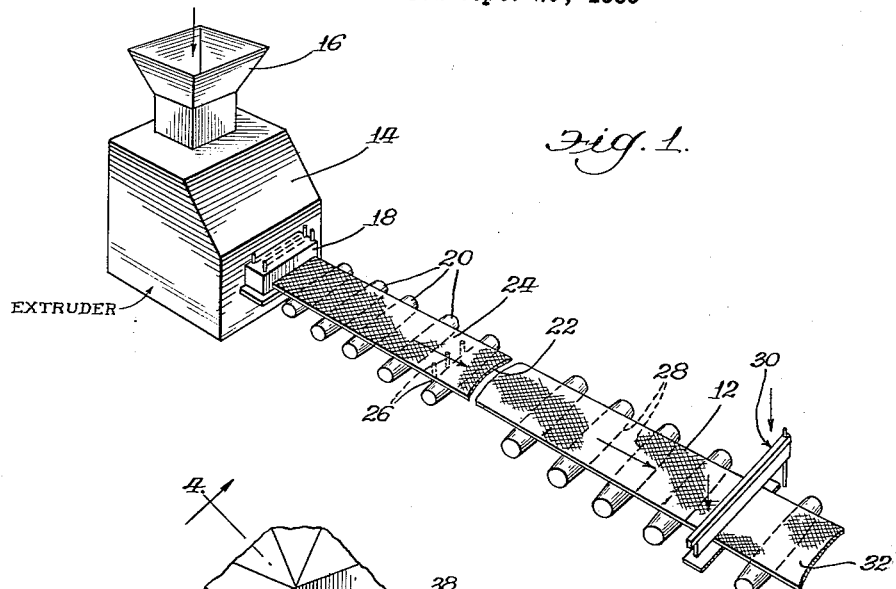
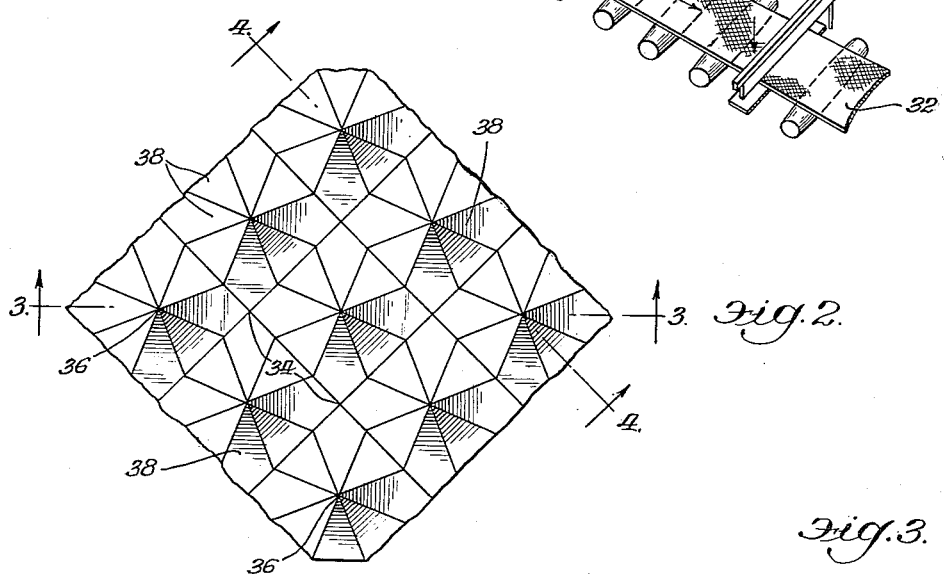
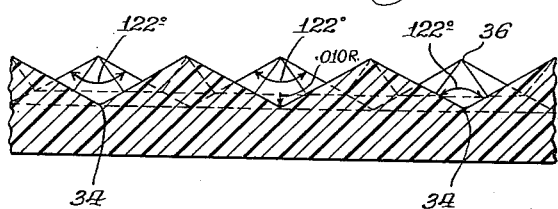
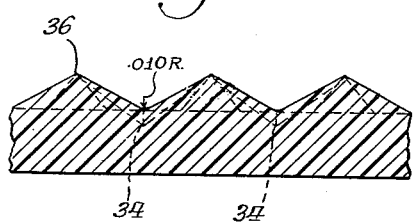
INVENTOR:
Donald W. Davis
BY
Kent W. Wonnell
Atty.

3,096,032
LIGHTING DIFFUSER
Donald W. Davis, Detroit, Mich., assignor to Lighting Products, Inc., Highland Park, Ill., a corporation of Illinois
Filed Sept. 23, 1959, Ser. No. 841,776
2 Claims. (Cl. 240—106)

This invention relates in general to a sheet plastic diffuser with a pattern of projections from one face thereof preferably made of clear plastic by an extrusion process and particularly designed for use for an electric lamp lighting diffuser although it may have a more general use wherever applicable.

Diffusers of this kind, particularly with a pattern of projections in accordance with this invention, have not previously been made by an extrusion process, and the present invention made of plastic material is particularly desirable as it is expensive to produce molds for making similar diffusers with angular light diffusing surfaces, and it is difficult to obtain the correct diffusion angle in the material on the projections as herein set forth.

An important object of the invention is to produce a lighting diffuser of clear plastic with an angular diffusing pattern in one face with angular depressions extending at the bases of the projections in the material, by extruded powdered plastic materials in a continuous thin sheet.

A further object of the invention is to provide a plastic diffuser made in a continuous sheet with projections on one face thereof in a diffusing angular pattern and curving the material transversely of its direction of extrusion with a slight concave curve in the pattern side.

A further object of the invention is to produce a lighting diffuser of plastic material, plain on one side with an angular pattern on the other side consisting of pyramids connected by angular diffusing planes forming depressions below the normal sides of the pyramids forming the projections.

A still further object of the invention is to provide a lighting diffuser of plastic material having regular eight side pyramidal projections extending from one side of the diffuser with alternate sides of the pyramid connected to corresponding sides of adjacent pyramids and extending angularly below the bases defined by the intermediate alternate sides of the pyramid.

Other objects of the invention will appear in the specification and will be apparent from the accompanying drawing in which, FIG. 1 is a perspective view representing somewhat diagrammatically the method of extruding a continuous strip or sheet of a plastic diffuser of this kind having a regular pattern of pyramidal projections on one side which is slightly curved transversely and cut off at desired lengths.

FIG. 2 is a fragmentary plan or face view of a regular pyramidal pattern having projections and corresponding depressions between the depressions with continuous beveled sides forming regular pyramidal tops and angular depressions between them.

FIG. 3 is a sectional view of a fragment as taken on the line 3—3 thereof; and

FIG. 4 is a sectional view of a fragment as taken on the line 4—4 thereof showing the angular pyramids and depressions.

It was heretofore considered necessary to cast or mold plastic sheet constructions of this kind particularly those having accurate projections and depressions therein; such molds are provided for limited sections, pieces or areas, the molds are relatively very expensive and the production rate is comparatively slow. By extruding a ribbon or strip of plastic material of the order of two feet in width using polystyrene and methyl methacrylate and like powders with suitable dyes in the extruder, a continuous sheet of material having a desired pattern and including both pyramidal projections and depressions from a given base in one surface of the sheet may be produced at a rapid rate.

In the method of producing a continuous sheet of thin material of this kind, it is found desirable to slightly curve the ribbon or sheet transversely of its length and concavely from the pattern side thereof, and after the extruded portion has been supported and run out a suitable distance so that it has become sufficiently set or hardened, it is cut off in desired lengths for convenient handling and use.

Referring now more particularly to the drawings, a continuous strip or sheet of a perforated light diffuser construction in accordance with this invention is discharged from a suitable extruder 14 having an outlet or hopper 16 for receiving the material of which the sheet is made and having suitable mechanism including an exit die 18 through which the sheet is extruded.

In discharging the sheet which is of suitable width such as 24 inches with a thickness of approximately 135 thousandths of an inch, it is necessary to support it continuously for a time until the material sufficiently sets or hardens, and for this reason, a conveyor represented by rollers 20 in FIG. 1 extends in front of the extruder for a sufficient distance. In order to suitably support and reinforce the sheet 12 as it is extruded and for subsequent use, it is arched or curved slightly at right angles to its longitudinal movement transversely of the sheet in an arc 22 concave at the under side of the extruded sheet with a radius of the order of two times or more of the width of the sheet, the pattern side of which is at the bottom in FIG. 1, the upper or exposed side 24 being clear and plain. To cause this curvature, a series of blowers having nozzles 26 are arranged transversely of the path of the sheet at the under side thereof, and in the conveyor as represented by their position between the rollers 20 so that the sheet is extruded and carried by the conveyors, the nozzles discharge air or gas upwardly against the under surface of the sheet, cooling it and curving it to form the slight arc 22 of transverse curvature and rollers 28 of the conveyor may be slightly larger or bulging in the center to maintain this curvature.

When the plastic sheet has been projected sufficiently from the extruder and carried by the conveyor to a suitable point, the strip is severed transversely by a cutter 30 operated either manually or automatically to cut off a piece 32 of desired length, a regular length for convenient handling being approximately 48" long.

The diffuser pattern here shown comprises depressions 34 in the form of four sided inverted pyramids extending substantially 23 thousandths of an inch below the common bases of these inverted pyramids and the sides are formed of continuations of the alternate facets 38 of octagonal pyramidal projections 36 which extend substantially 55 thousandths of an inch above the common bases of the pyramids 34 and 36. The total thickness of a diffuser plate is 135 thousandths of an inch, the width of the sides at the base of the inverted pyramid is 82 thousandths of an inch, the distance apart of diagonal apices is approximately 282 thousandths of an inch and the angle between such diagonal apices and also the angle of the sides of the inverted pyramids 34 is 122°.

The dimensions of the projecting and inverted pyramids is thus given in detail since they are critical to the successful performance of the plastic extruded sheet as a lighting diffuser. The depths of the inverted pyramids 34 below the common bases of these pyramids and the projecting pyramids 36 is thus 23 thousandths of an inch whereas the projection of the pyramids 36 above said common base is substantially 55 thousandths of an inch. The angles of the sides of the outward and inverted pyramids being progressive in the same direction from the apices of the inverted pyramids are in the same direction so that dies of the extruder can be removed freely from the plastic material without damaging it in forming the depressions and projections of the diffuser plate.

Thus an accurate pattern of octagonal pyramidal projections and square pyramidal depressions are made in one face of material producing a multiple of diffusing angular facets completely occupying the space at the diffusing side of the sheet, arranged in regular order, the octagonal pyramids having alternate sides which extend directly into and forming the corresponding sides of the inverted square pyramids, which is not true of hexagonal and other patterns which of themselves fit tightly together.

Plastic panels of this construction are highly desirable for use in electric lighting fixtures particularly that type in which lamps are located at one side of a plastic transparent pattern, usually enclosed in a rectangular or other casing and producing a diffused but bright illumination at the other or outer side of the casing or fixture. This construction has the advantage that the plastic material is light, strong and with multiple facets produces a bright and shining diffusion which contributes greatly to the desirability of lighting fixtures which use single or a multiple lighting tube.

In forming the panels used for a lighting diffuser, it will be noted particularly from FIG. 2 that the lines of intersections of the bases of the pyramids are diagonal to the direction of extrusion, substantially at an angle of 45° by which greater stiffness is obtained in the relatively thin panel since the linear crystalline structure of the plastic, resulting from the extrusion process, is not parallel to the fracture line between the pyramids resulting in greater strength for a panel of given thickness. All lines of intersection between adjacent pyramids have a small radius of approximately 10 thousandths of an inch as shown in FIGS. 2 and 3 which additionally strengthen the panel since two intersecting surfaces tend to fracture, when stressed, along the line of intersection between them unless a curved line is provided to distribute the strain over a greater area.

The present panel has regular octagonal pyramids uniformly staggered relative to the longitudinal or transverse access of the extruded strip forming a common line resulting in triangular surfaces extending from the bases to the apices of the adjacent pyramids. The opposing surfaces of diagonally opposite adjacent pyramids being diamond shaped converge in a point. Thus the entire configurated side of the panel is covered with prisms; there are no surfaces which do not contribute to the directional control of light transmitted from the plane side of the panel. By staggering the pyramids, the effective thickness of the panel for stiffening purposes is greater than the thickness to the base of the pyramid, that is, it is 80 thousandths of an inch rather than 55 thousandths of an inch (entire thickness 135 thousandths minus 55 thousandths).

This design of the surface results in eight prismatic facets for directional concentration of light transmitted through the panel from the plane side and is more effective than pyramids having fewer prismatic surfaces. By concentrating the light into a beam having a divergence of 45° from the base of the beam, measured from the limits of the transmitting panel, the surface brightness can be kept desirably low. Thus the transmitting panel concentrates the light into a smaller area and thereby increasing the intensity of the illuminated area and reducing the glare which results from light escaping at angles between 45° and the plane of the panel. Fewer prismatic surfaces will not concentrate transmitted light as effectively.

Instead of being bright and entirely clear, transparent material, the plastic may also be slightly tinted or colored by introducing suitable coloring matter in the plastic mixture as it is extruded. By forming the plastic with a slight arc therein transversely of its length, the sides of the plates being usually supported, the weight of the sheet will tend to flatten this arc as the sheet is used which will support the diffuser in substantially flat condition in actual use.

The plate may also be pigmented with a suitable material in the extrusion process to produce a milk-white instead of a water clear panel for application where reflected glare would be objectionable. The concentrating character of the panel can thus be altered to produce a wider dispersion by the addition of pigment.

While this lighting diffuser has been particularly described as desirable for use in connection with electric fixtures, it may have a more general use as a light diffuser wherever used, the projections and depressions form a pleasing pattern and design.

While an improved panel like diffuser and the method of making it by extrusion has been described in some detail, the invention should be regarded by way of an illustration and example rather than a restriction or limitation thereof, as many changes in the construction, combination and arrangement of the parts may be made without departing from the spirit and scope of the invention.

This application is a continuation-in-part of application Serial No. 719,642 filed March 6, 1958, now Patent No. 3,049,616.

I claim:

1. A solid imperforate light diffuser plate of plastic material smooth on one side and having octagonal pyramidal projections and square pyramidal inwardly extending recesses arranged closely together in the other side of the plate in a regular pattern with the octagonal apices outwardly, the alternate sides of each pyramid meeting the alternate bases of adjacent sides and bases of adjacent pyramids on all four sides, and the other four alternate sides of each pyramid extending inwardly in the planes of the sides of the recess, each to meet at the apex of the recess in the plate forming each of said pyramidal square inwardly extending recesses, the four outward sides of the base of each recess defining a common plane for the bases of all of the outward pyramidal projections, the four common sides of each recess and of the corresponding octagonal pyramids being thus continuous and each pair of opposite sides being at an angle of approximately 122°.

2. A solid imperforate plastic light diffuser plate adapted to be extruded, smooth on one side with octagonal pyramidal projections, and continuing recesses extending oppositely from a common basis in a regular pattern on the other side of the plate, the recesses being square and the sides of the recesses continuing inwardly to separate apices from the alternate faces of the outward pyramidal projections at the same inclination so the plate may be removed at one side of an extruder die, each recess having edges in the common base about 82 thousandths of an inch square, the apex of each square depression being about 23 thousandths of an inch from said side edges and common base, the height of each octagonal pyramid apex above the common base being about 55 thousandths of an inch, the plate being 80 thousandths of an inch thick from the common base of the octagonal pyramids to the smooth side of the plate and the plate being about 135 thousandths of an inch thick from the smooth side of the plate to the apices of the octagonal pyramidal projections.

References Cited in the file of this patent
UNITED STATES PATENTS

| | | |
|---|---|---|
| 1,194,294 | Johanson | Aug. 8, 1916 |
| 1,761,654 | Cole | June 3, 1930 |
| 2,451,986 | Slaughter | Oct. 19, 1948 |
| 2,546,629 | Brillhart | Mar. 27, 1951 |
| 2,640,149 | Arenberg | May 26, 1953 |
| 2,819,493 | Hawtin et al. | Jan. 14, 1958 |
| 2,859,334 | Guth | Nov. 4, 1958 |
| 2,904,673 | Guth | Sept. 15, 1959 |
| 3,001,062 | Winkler | Sept. 19, 1961 |